(12) United States Patent
Snir

(10) Patent No.: US 11,322,045 B2
(45) Date of Patent: May 3, 2022

(54) URINATING GUIDING ACCESSORY

(71) Applicant: Itshak Snir, Moshav Menucha (IL)

(72) Inventor: Itshak Snir, Moshav Menucha (IL)

( * ) Notice: Subject to any disclaimer, the term of this patent is extended or adjusted under 35 U.S.C. 154(b) by 637 days.

(21) Appl. No.: 16/340,709

(22) PCT Filed: Nov. 7, 2017

(86) PCT No.: PCT/IL2017/051211
§ 371 (c)(1),
(2) Date: Apr. 10, 2019

(87) PCT Pub. No.: WO2018/096527
PCT Pub. Date: May 31, 2018

(65) Prior Publication Data
US 2019/0318655 A1    Oct. 17, 2019

Related U.S. Application Data

(60) Provisional application No. 62/426,617, filed on Nov. 28, 2016.

(51) Int. Cl.
| | |
|---|---|
| *G09B 19/00* | (2006.01) |
| *A47K 13/06* | (2006.01) |
| *A47K 17/00* | (2006.01) |
| *A47K 13/24* | (2006.01) |

(52) U.S. Cl.
CPC .......... *G09B 19/0076* (2013.01); *A47K 13/06* (2013.01); *A47K 17/00* (2013.01); *A47K 13/24* (2013.01)

(58) Field of Classification Search
CPC .... G09B 19/0076; A47K 13/06; A47K 17/00; A47K 13/24
See application file for complete search history.

(56) References Cited

U.S. PATENT DOCUMENTS

| | | | |
|---|---|---|---|
| 5,926,867 A * | 7/1999 | Buchanan | F21V 33/004 353/62 |
| 2003/0035302 A1 | 2/2003 | Friedman | |
| 2012/0023651 A1 * | 2/2012 | Taylor | A47K 13/24 4/234 |
| 2016/0307462 A1 | 10/2016 | McCarthy | |

FOREIGN PATENT DOCUMENTS

| | | |
|---|---|---|
| JP | 2005299342 A | 10/2005 |
| WO | 2017161270 A1 | 9/2017 |

OTHER PUBLICATIONS

IllumiBowl, https://www.youtube.com/watch?v=zd-fOdKS6ok, Dec. 7, 2015.

* cited by examiner

*Primary Examiner* — Robert J Utama

(57) ABSTRACT

A urinating guiding accessory (10), including: a projector (24), being disposed on a rear (64) top (66) of a toilet bowl (12), and directed towards a front internal wall (60) of the bowl (12), for projecting a guiding picture (14) onto the front internal wall (60) of the bowl (12); and a sensor (20), being disposed on the rear top of the toilet bowl (12) and directed outwards back (70) the toilet bowl (12) towards the user (50), for sensing the user's position, for controlling the guiding picture (14) accordingly.

6 Claims, 4 Drawing Sheets

URINATING GUIDING ACCESSORY

CROSS-REFERENCE TO RELATED APPLICATIONS

This application is a U.S. National Phase Application under 35 U.S.C. 371 of International Application No. PCT/IL2017/051211, which has an international filing date of Nov. 7, 2017, and which claims the benefit of U.S. Provisional Application No. 62/426,617, filed Nov. 28, 2016, the disclosure of which is incorporated herein by reference in its entirety.

TECHNICAL FIELD

The invention relates to the field of urinating training.

BACKGROUND

There is a long felt need to provide a solution to train a new user, such as an infant, correct standing urinating.

SUMMARY

A urinating guiding accessory, including: a projector; and a sensor, for controlling the guiding picture.

DETAILED DESCRIPTION

Figure 1:
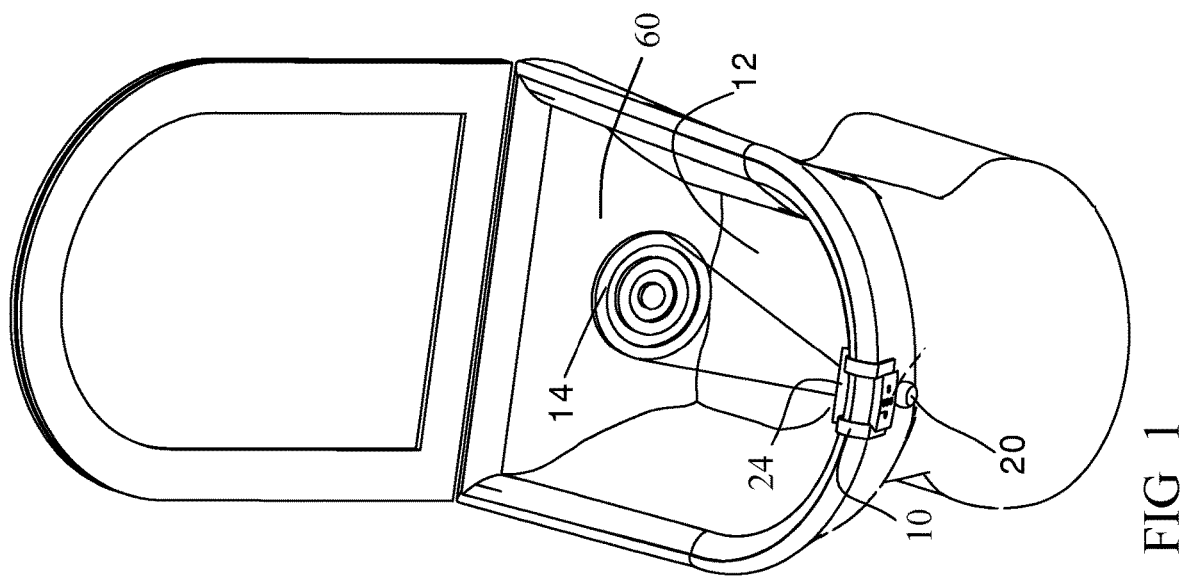
FIG. 1 depicts a urinating guide according to one embodiment of the invention.

FIG. 1 depicts a urinating guide according to one embodiment of the invention.

A urinating guide 10 according to one embodiment of the invention, is intended to be disposed on a wall top of a toilet's bowl 12; and includes a projector 24, for producing a picture 14; and a sensor 20, for controlling the content of picture 14, according to the position of the user.

Figure 2:
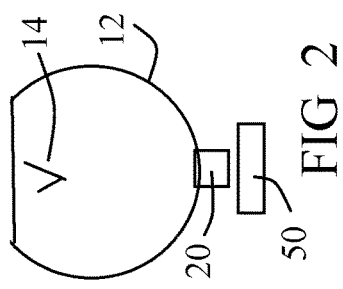
FIG. 2 is a top view, for explaining the determination of the sensor of FIG. 1 according to the location of the user.

FIG. 2 is a top view, for explaining the determination of the sensor of FIG. 1 according to the location of the user.

In case the user 50 is located against sensor 20, projector 24 produces a picture recommending the current position of the user.

Figure 3:
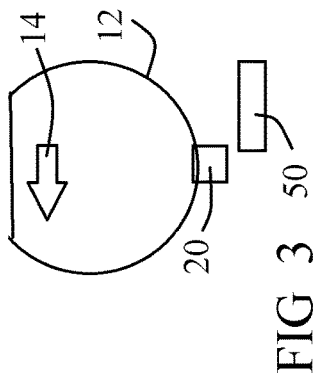
FIG. 3 is the top view of FIG. 2 in case the user is located right to the center.

FIG. 3 is the top view of FIG. 2 in case the user is located right to the center.

In case the user 50 is located right (52A) to the center 62, i.e. right to sensor 20, projector 24 produces picture 14, instructing the user to move left (54A).

Figure 4:
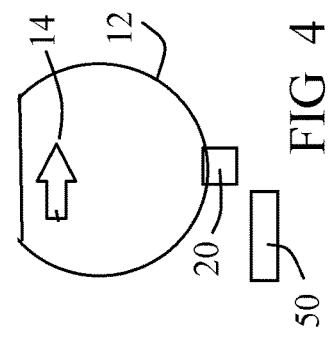
FIG. 4 is the top view of FIG. 2 in case the user is located left to the center.

FIG. 4 is the top view of FIG. 2 in case the user is located left to the center.

In case the user 50 is located left (52B) to the center, i.e. left to sensor 20, projector 24 produces picture 14, instructing the user to move right (54B).

Referring again to FIG. 2, in case the user 50 is located parallel to sensor 20, projector 24 produces an OK picture.

Figure 5:
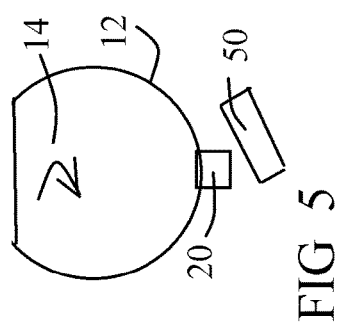
FIG. 5 is the top view of FIG. 2 in case the user is disposed rotated.

FIG. 5 is the top view of FIG. 2 in case the user is disposed rotated.

In case the user 50 is disposed rotated, projector 24 produces a picture, instructing the user to rotate to the other direction.

Figure 6:
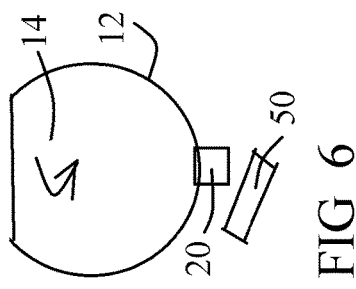
FIG. 6 is the top view of FIG. 2 in case the user is disposed rotated to the other direction.

FIG. 6 is the top view of FIG. 2 in case the user is disposed rotated to the other direction.

In case the user 50 is disposed rotated to the other direction, projector 24 produces a picture, instructing the user to rotate thereagainst.

Figure 7:
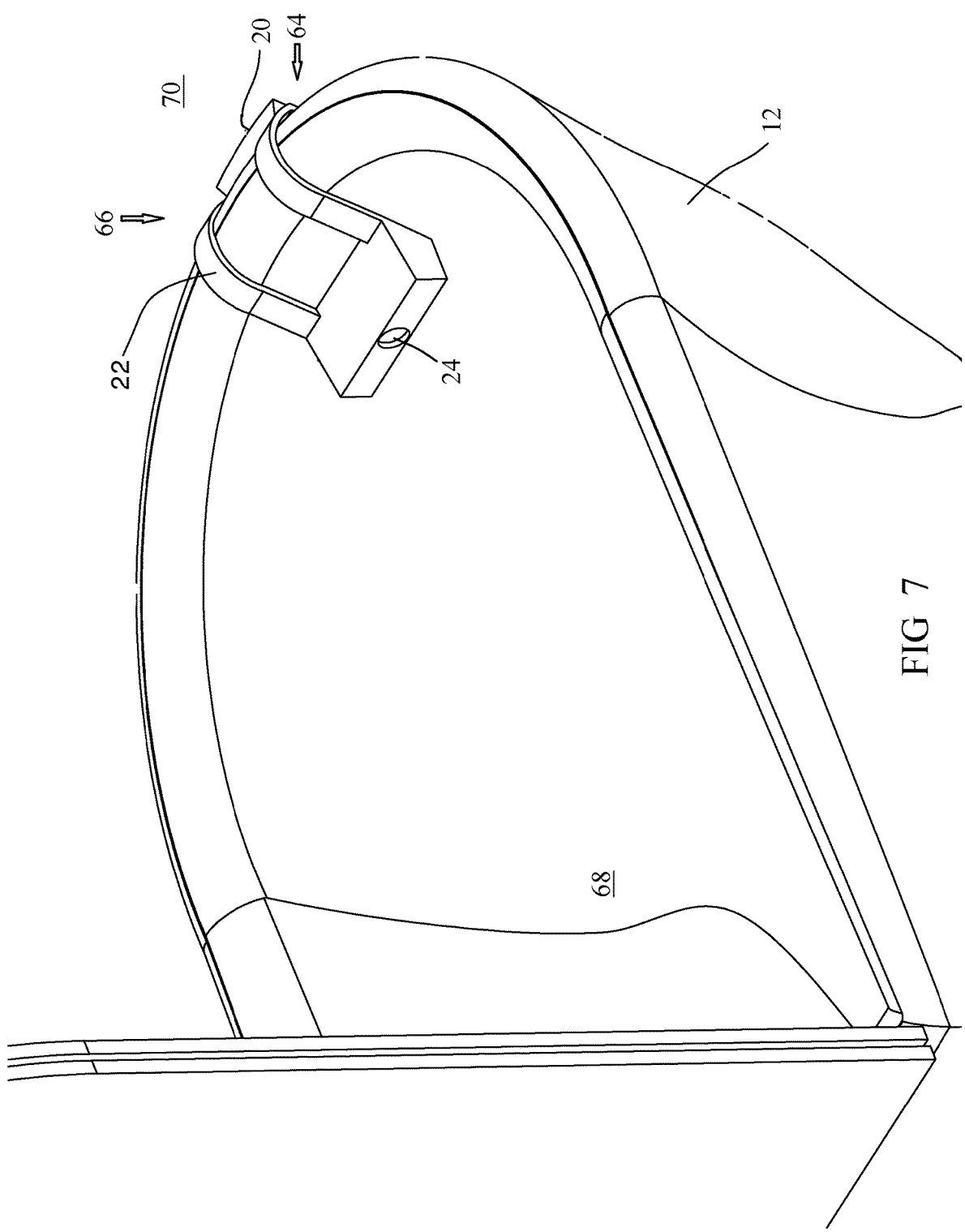
FIG. 7 shows the accessory from another angle of view.

FIG. 7 shows the accessory from another angle of view.

Projector 24 and as well sensor 20 are disposed on the rear 64 of toilet bowl 12 at the top 66 thereof. Projector 24 is directed to the front 68 of the bowl, and sensor 20 is directed outwards back 70 the toilet bowl 12.

Figure 8:
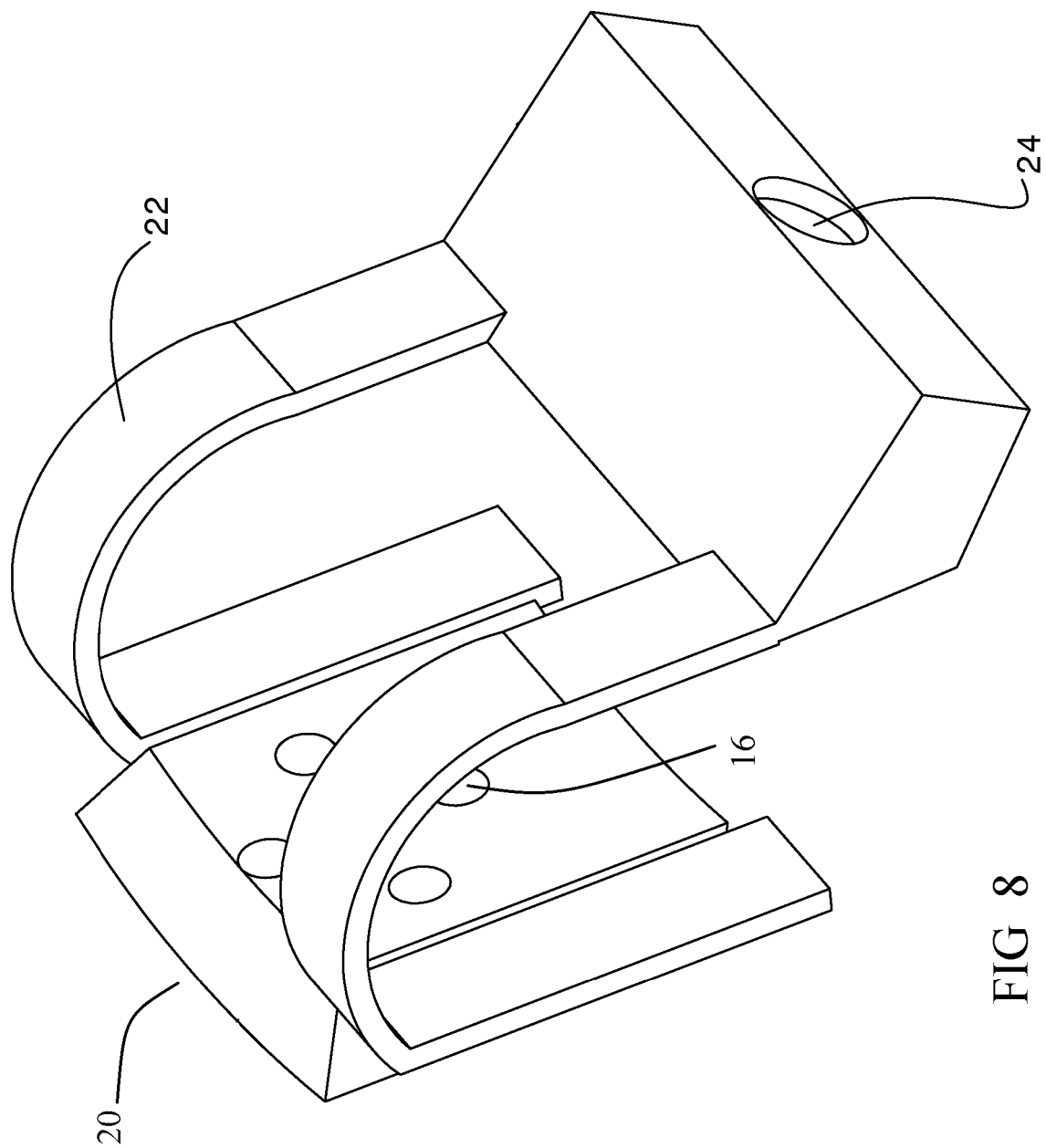
FIG. 8 shows the accessory of FIG. 1 only.

FIG. 8 shows the accessory of FIG. 1 only.

A loudspeaker 16 may further guide the user, in addition to the guidance of projector 24. For example, in the case of FIG. 3, loudspeaker may announce "move to the left".

Straps 22 crossing the rear top of the bowl allow directing projector 24 to the front and sensor 20 to the rear.

Figure 9:
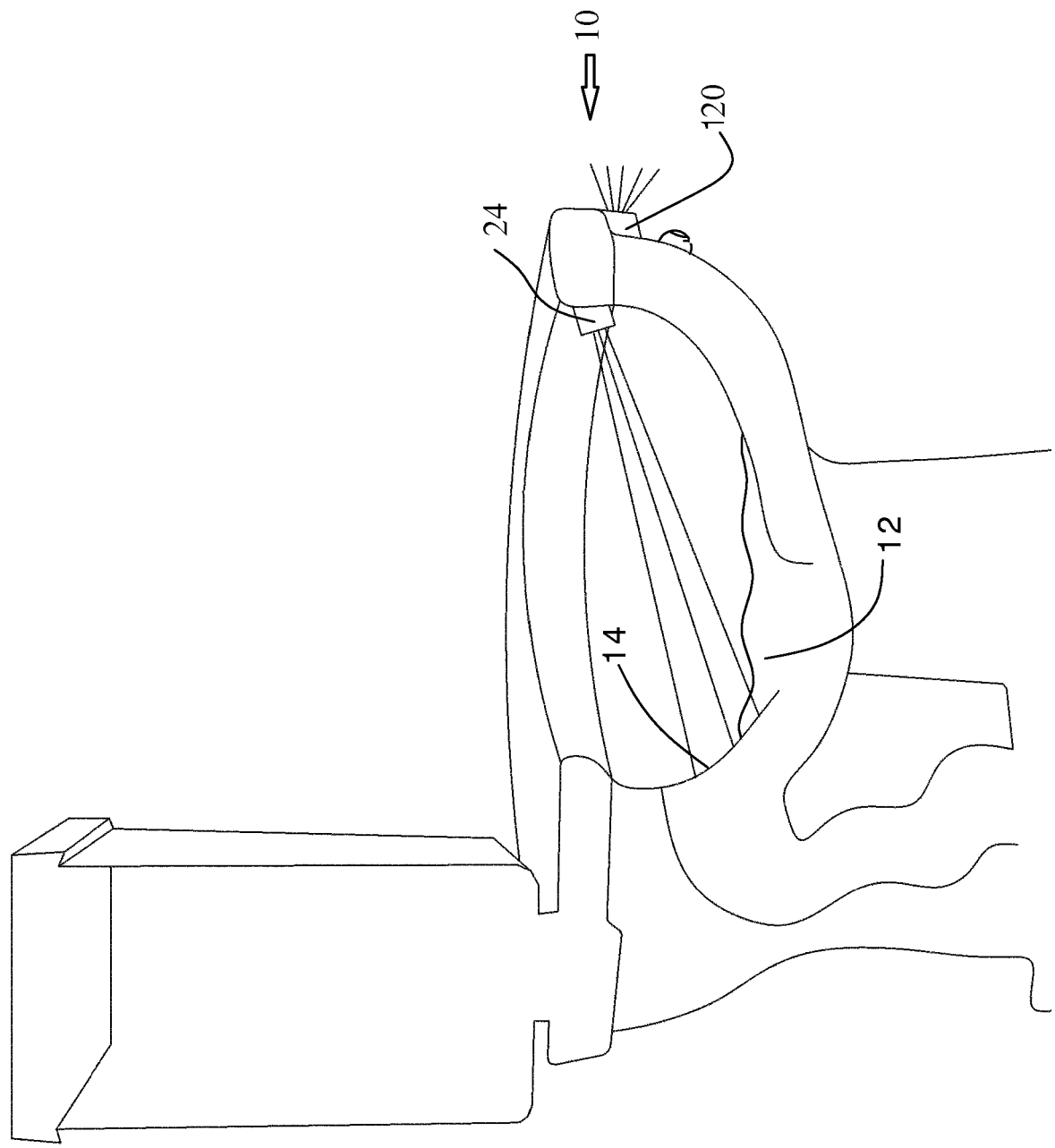
FIG. 9 shows the accessory from another angle of view.

FIG. 9 shows the accessory from another angle of view.

Projector 24 aims rays to the front, and sensor 20 includes a source aiming rays to the rear.

The terms "preferred location" or "preferred rotational state" refer herein to the state considered best aiming the urinating flush.

Thus, in one aspect, the invention is directed to a urinating guiding accessory (10), including:
- a projector (24), being disposed on a rear (64) top (66) of a toilet bowl (12), and directed towards a front internal wall (60) of the bowl (12), for projecting a guiding picture (14) onto the front internal wall (60) of the bowl (12); and
- a sensor (20), being disposed on the rear top of the toilet bowl (12) and directed outwards back (70) the toilet bowl (12) towards the user (50), for sensing the user's position, for controlling the guiding picture (14) accordingly.

The guiding picture (14) may constitute a projected spot, being located on a location being preferred for aiming the urinating.

The guiding picture (14) may constitute a picture (14) guiding the user to position himself as a function of the sensed user's position.

The sensing of the user's position may constitute sensing sided location (52A) of the user, for guiding the user to locate himself to an opposite side (54A).

The sensing of the user's position may constitute sensing a rotational state (56A) of the user, for guiding the user to rotate himself to an opposite direction (58A).

Numeral 10 denotes the urinating guiding accessory according to one embodiment of the invention;
numeral 12 denotes the toilet bowl;
numeral 14 denotes the projected picture;
numeral 16 denotes a loudspeaker;
numeral 20 denotes the sensor, for sensing the user's location and rotational state;
numeral 22 denotes a strap;
numeral 50 denotes the user;
numeral 52A denotes the state that the user is located right to the preferred location;

numeral 52B denotes the state that the user is located left to the preferred location;

numeral 54A denotes a picture guiding the user to move to the left;

numeral 54B denotes a picture guiding the user to move to the right;

numeral 56A denotes the state that the user is rotated counter-clockwise from the preferred rotational state;

numeral 56B denotes the state that the user is rotated clockwise from the preferred rotational state;

numeral 60 denotes the front internal wall of the toilet bowl;

numeral 64 denotes the rear of the toilet bowl;

numeral 66 denotes the top of the toilet bowl;

numeral 68 denotes the front of the toilet bowl;

numeral 70 denotes outwards back the toilet bowl;

The reference numbers in the claims are not a part of the claims.

What is claimed is:

1. A urinating guiding accessory (10), comprising:

a projector (24), being disposed on a rear (64) top (66) of a toilet bowl (12), and directed towards a front internal wall (60) of said toilet bowl (12), for projecting a guiding picture (14) onto said front internal wall (60) of said bowl (12); and a sensor (20), being disposed on said rear top of said toilet bowl (12) and directed towards outwards back (70) of said toilet bowl (12), for sensing the user's position, for controlling said guiding picture (14) accordingly.

2. A urinating guiding accessory (10) according to claim 1, wherein said guiding picture (14) comprises a projected spot, being located on a location being preferred for aiming the urinating.

3. A urinating guiding accessory (10) according to claim 1, wherein said guiding picture (14) comprises a picture (14) guiding the user to position himself as a function of said sensed user's position.

4. A urinating guiding accessory (10) according to claim 3, wherein said sensing of the user's position comprises sensing sided location (52A) of the user, for guiding the user to locate himself to an opposite side (54A).

5. A urinating guiding accessory (10) according to claim 3, wherein said sensing of the user's position comprises sensing rotational state (56A) of the user, for guiding the user to rotate himself to an opposite direction (58A).

6. A urinating guiding accessory (10) according to claim 1, further comprising:

a loudspeaker (16), for producing a vocal guiding as a function of said sensed user's position.

\* \* \* \* \*